United States Patent
Ko

(10) Patent No.: US 8,726,452 B2
(45) Date of Patent: May 20, 2014

(54) WIPER DEVICE HAVING IMPROVED DURABILITY

(71) Applicant: Dongyang Mechatronics Corp., Incheon (KR)

(72) Inventor: Kyoung Ho Ko, Incheon (KR)

(73) Assignee: Dongyang Mechatonics Corp., Incheon (KR)

( * ) Notice: Subject to any disclaimer, the term of this patent is extended or adjusted under 35 U.S.C. 154(b) by 0 days.

(21) Appl. No.: 13/791,294

(22) Filed: Mar. 8, 2013

(65) Prior Publication Data

US 2013/0239355 A1    Sep. 19, 2013

(30) Foreign Application Priority Data

Mar. 13, 2012   (KR) ........................ 10-2012-0025672

(51) Int. Cl.
*B60S 1/34* (2006.01)
*B60S 1/32* (2006.01)

(52) U.S. Cl.
USPC ............... 15/250.352; 15/250.351; 15/250.19

(58) Field of Classification Search
CPC ............ B60S 1/32; B60S 1/34; B60S 1/3425; B60S 1/3429; B60S 1/3431; B60S 1/3413; B60S 1/3434; B60S 1/345; B60S 1/3456
USPC .......................... 15/250.351, 250.352, 250.19
See application file for complete search history.

(56) References Cited

U.S. PATENT DOCUMENTS

| 4,170,804 A * | 10/1979 | Scotcher | 15/250.34 |
| 2002/0144373 A1 * | 10/2002 | Muramatsu | 15/250.352 |
| 2009/0188068 A1 * | 7/2009 | Waible | 15/250.31 |

FOREIGN PATENT DOCUMENTS

| DE | 10 2009 029 427 A1 | 3/2011 |
| DE | 102009029427 A1 * | 3/2011 |
| EP | 0584018 * | 2/1994 |
| GB | 2151465 * | 7/1985 |
| JP | 2005-254937 A | 9/2005 |
| JP | 2009-262589 A | 11/2009 |
| KR | 10-0692068 B | 3/2007 |
| KR | 10-0712243 B | 4/2007 |
| KR | 10-0800581 B | 1/2008 |

OTHER PUBLICATIONS

Notice of Allowance issued by Korean Patent Office for priority Korean application 10-2012-0025672 with English translation.
German Search Report/Translation dated Nov. 13, 2013.
German Office Action/Translation dated Nov. 13, 2013.

* cited by examiner

*Primary Examiner* — Gary Graham
(74) *Attorney, Agent, or Firm* — Frommer Lawrence & Haug LLP; Ronald R. Santucci

(57) ABSTRACT

A wiper device having improved durability includes: an arm head having one end fixed to a pivot shaft installed on a vehicle; and a retainer having one end coupled to the arm head to rotate relative to the arm head and the other end coupled to a blade for wiping a glass of the vehicle, wherein the retainer includes: a body formed of synthetic resins; and a reinforcement member that is coupled to a portion of the retainer, which is adjacent to the arm head, and is formed of a metal material.

3 Claims, 4 Drawing Sheets

WIPER DEVICE HAVING IMPROVED DURABILITY

CROSS-REFERENCE TO RELATED PATENT APPLICATION

This application claims the benefit of Korean Patent Application No. 10-2012-0025672, filed on Mar. 13, 2012, in the Korean Intellectual Property Office, the disclosure of which is incorporated herein in its entirety by reference.

BACKGROUND OF THE INVENTION

1. Field of the Invention

The present invention relates to a wiper device for vehicles, and more particularly, to a wiper device having a lock back function.

2. Description of the Related Art

In general, a rear wiper sometimes needs to be installed on a rear glass of a vehicle according to an inclined angle of the rear glass. A rear wiper is not generally provided on a rear glass of a vehicle of a notch-back style that is called a sedan, but on a hatch-back style vehicle such as a sports utility vehicle (SUV) that essentially has a rear wiper on a rear glass thereof, because that dust is likely to get stuck on the rear glass due to low pressure on the rear glass during driving.

An example of a vehicle having a conventional rear wiper on a rear glass thereof is shown in FIG. 1. In general, a rear wiper consists of a plurality of components. Such a wiper device is disclosed in Korean patent No. 0800581.

Referring to FIG. 1, a conventional wiper device 1 includes three components. That is, the conventional wiper device 1 includes an arm head 2, a retainer 3, and a blade (not shown). The arm head 2 is fixed to a pivot shaft 6 installed on a car body and is rotated together with the pivot shaft 6 by the rotation of the pivot shaft 6. The retainer 3 is coupled to one end of the arm head 2 and transmits the torque of the arm head 2 to the blade. The blade wipes a glass of a vehicle to remove a foreign material on the glass while contacting and sliding on the glass.

In the wiper device 1 having such a structure, generally, a tension spring 5 is used in a connection structure between the retainer 3 and the arm head 2 so that the blade may apply pressure to the glass of the vehicle. One end of the tension spring 5 is hanged to the retainer 3, and the other end of the tension spring 5 is hanged to the arm head 2. Thus, when rotating the retainer 3 in a direction away from the glass of the vehicle due to an action of the tension spring 5, a direction in which the restitutive force of the tension spring 5 acts is changed according to a range of a rotation angle of the retainer 3. That is, an action line TL illustrated in FIG. 1 occurs. A function in which the action direction of the restitutive force of the tension spring 5 is changed is referred to as a toggle action. When the retainer 3 rotates beyond a transversal line, namely, the action line TL due to the toggle action, a lock back state, that is, a state where the blade does not press on the glass of the vehicle and is spaced apart from the glass, occurs. The lock back state is used when exchanging or repairing the blade. However, since recently, a plastic is used as a material of the retainer 3, when a toggle action is repeated between a location of a lock back state and a location of a non-lock back state, a contact portion between the retainer 3 and the arm head 2 is worn, and thus a function of the retainer 3 deteriorates. In addition, when the vehicle repeatedly enters an automatic car wash to be cleaned, the retainer formed of a plastic material is damaged. In particular, a wiper device disclosed in Korean patent No. 0800581 is configured so that a lock back state is attained in two stages, but in this case, a first lock back function may be damaged due to a repeated load.

SUMMARY OF THE INVENTION

The present invention provides a wiper device in which a lock back function is not damaged in spite of a repeated lock back operation by improving a structure to improve the durability of a portion of a retainer, which is adjacent to an arm head.

According to an aspect of the present invention, there is provided a wiper device having improved durability, the wiper device including: an arm head having one end fixed to a pivot shaft installed on a vehicle; and a retainer having one end coupled to the arm head to rotate relative to the arm head and the other end coupled to a blade for wiping a glass of the vehicle, wherein the retainer includes: a body formed of synthetic resins; and a reinforcement member that is coupled to a portion of the retainer, which is adjacent to the arm head, and is formed of a metal material.

The reinforcement member may be coupled to the body by an insert molding method.

The reinforcement member may include a pair of reinforcement members symmetrically disposed each other, and the pair of reinforcement members may be disposed to be spaced apart from each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described with reference to accompanying drawings.

Figure 1:
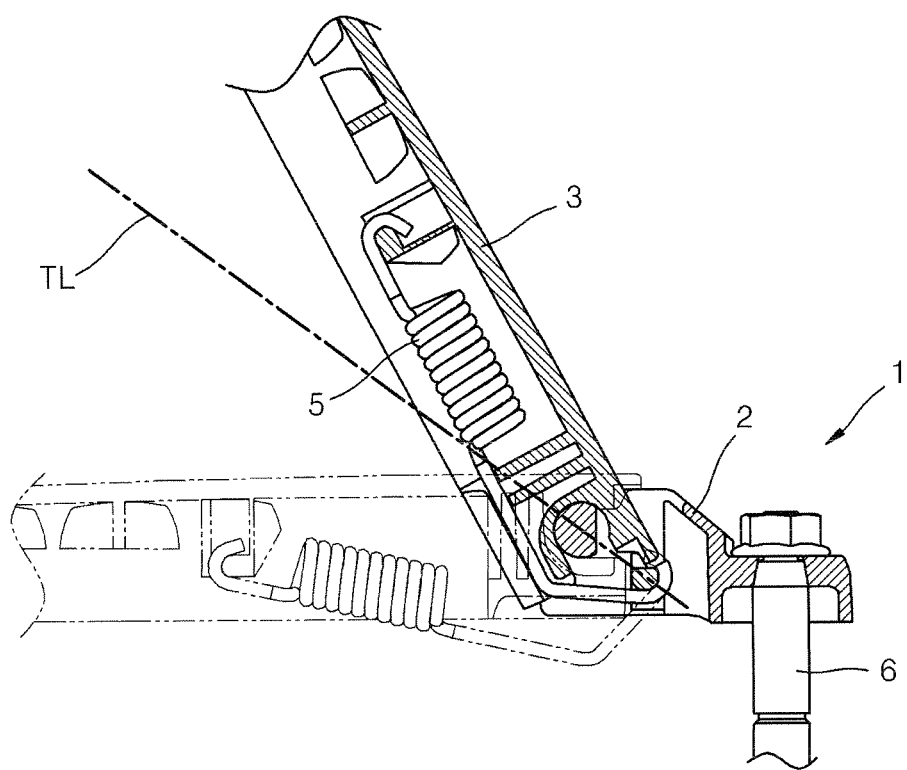
FIG. 1 is a diagram showing a lock back state of a wiper device.
Figure 2:
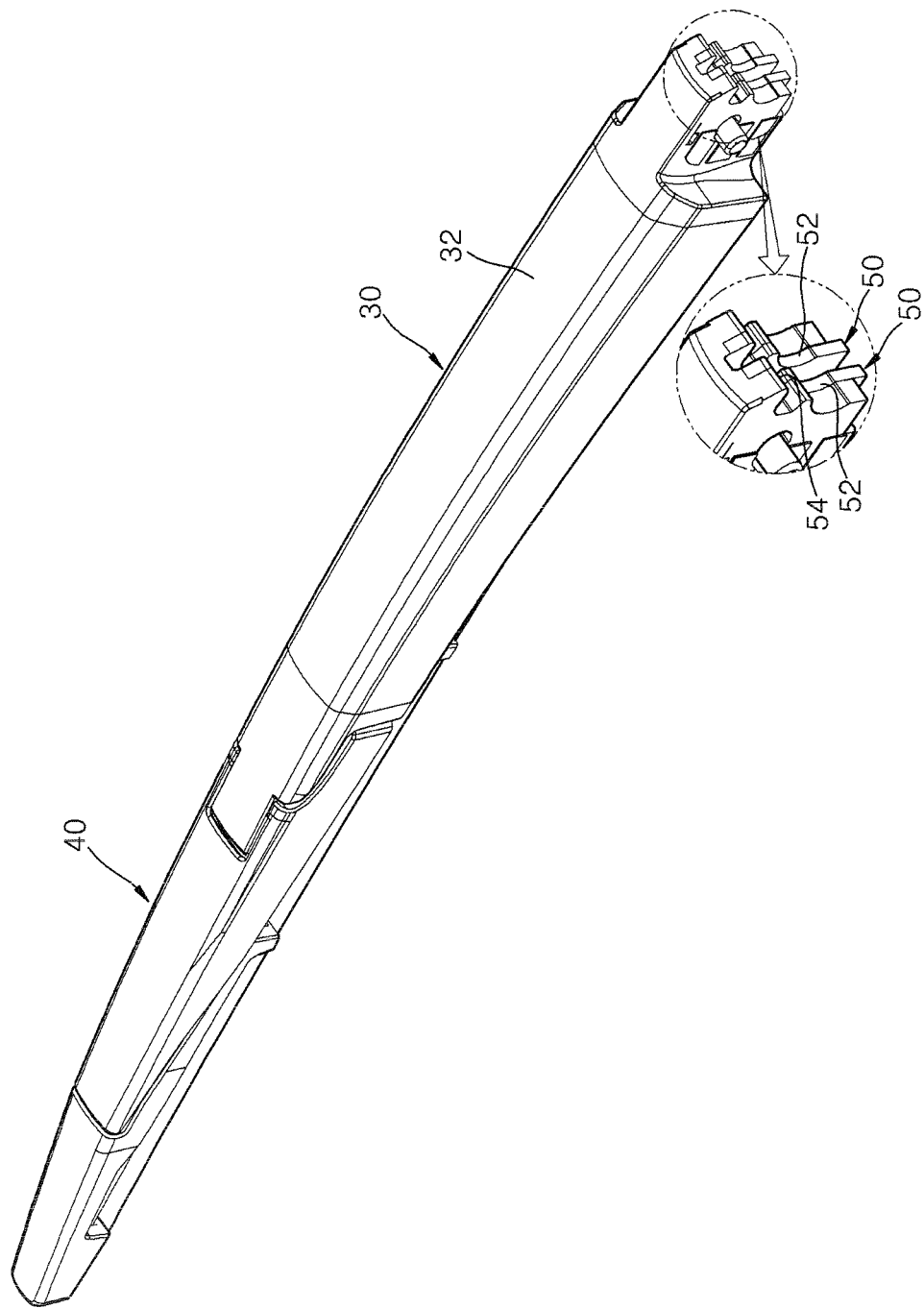
FIG. 2 is a diagram showing a main structure of a retainer of a wiper device according to an embodiment of the present invention.
Figure 3:
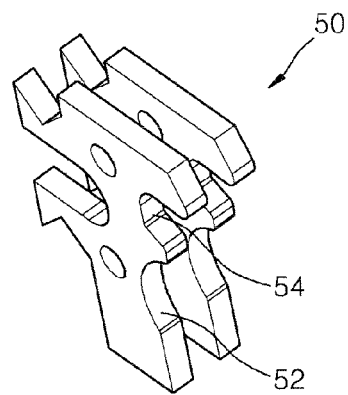
FIG. 3 is a diagram showing a structure of a reinforcement member of the retainer illustrated in FIG. 2.
Figure 4:
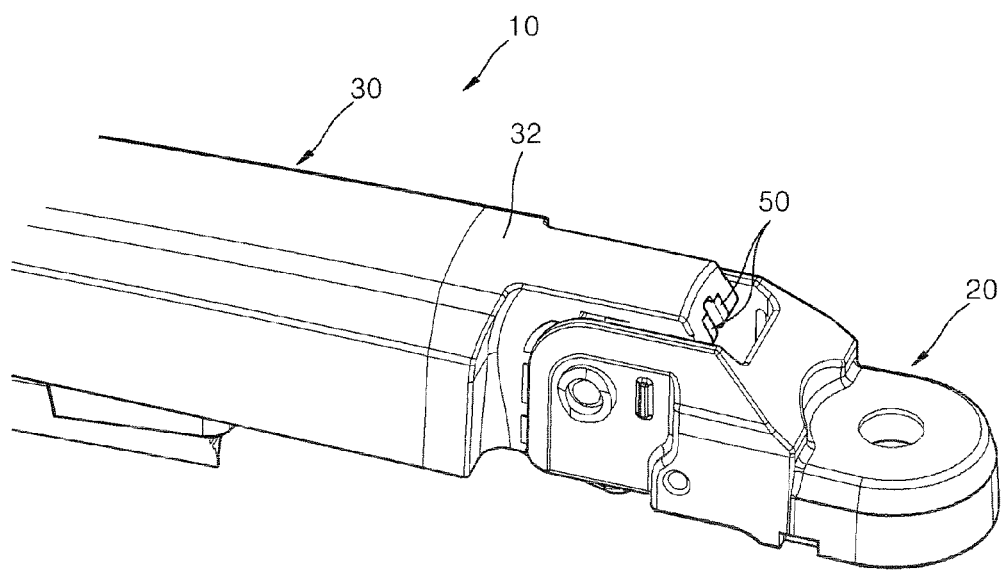
FIG. 4 is a diagram showing a wiper device in a state where a retainer and an arm head are coupled to each other.
Figure 5:
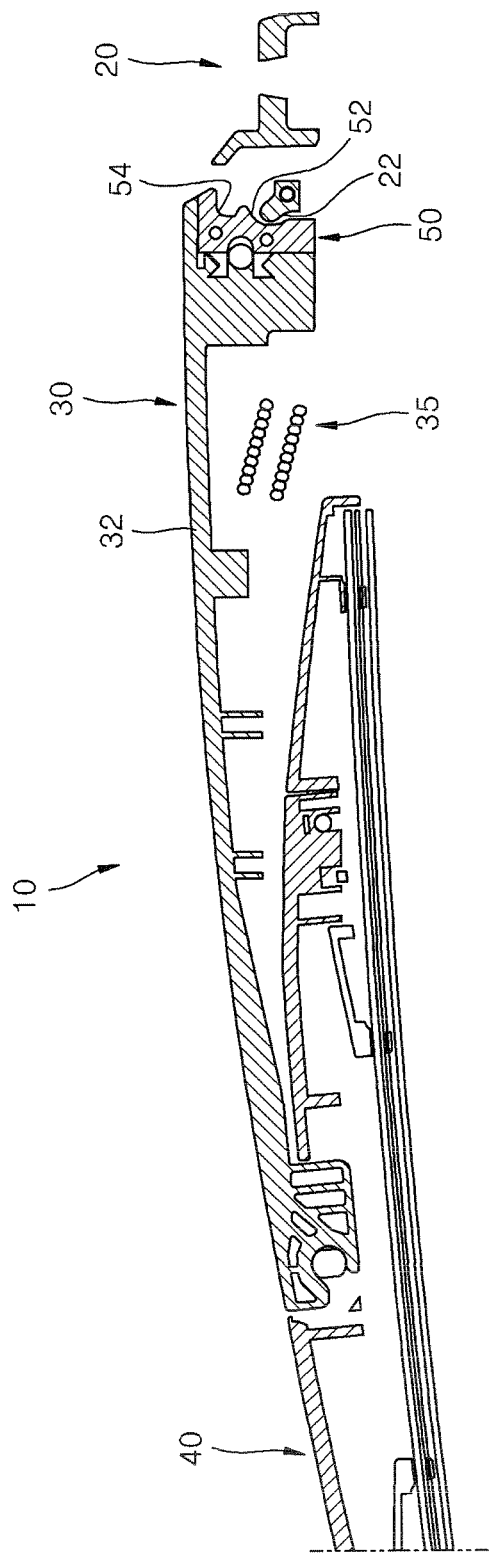
FIG. 5 is a longitudinal sectional view of the wiper device illustrated in FIG. 4.

FIG. 2 is a diagram showing a main structure of a retainer 30 of a wiper device according to an embodiment of the present invention. FIG. 3 is a diagram showing a structure of a reinforcement member 50 of the retainer 30 illustrated in FIG. 2. FIG. 4 is a diagram showing a wiper device 10 in a state where the retainer 30 and an arm head 20 are coupled to each other. FIG. 5 is a longitudinal sectional view of the wiper device 10 illustrated in FIG. 4.

Referring FIGS. 2 through 5, the wiper device 10 having improved durability includes the arm head 20, the retainer 30, a tension spring 35, a blade 40, and the reinforcement member 50.

One end of the arm head 20 is fixed to a pivot shaft fixedly installed on a vehicle, for example, by using a cap nut or the like. The pivot shaft is connected to a link structure connected to a motor and is rotated by a driving force of the motor. Such a structure is disclosed in Korean patent No. 0800581. The arm head 20 rotates on a portion fixed to the pivot shaft within a range of a predetermined angle as the pivot shaft rotates.

One end of the retainer 30 is rotatably coupled to the arm head 20. The other end of the retainer 30 is coupled to the blade 40 that directly contacts a glass of the vehicle and wipes a foreign material on the glass.

The retainer 30 is strongly coupled to the arm head 20 by the tension spring 35. Ends of the tension spring 35 are supported by the arm head 20 and the retainer 30. The tension spring 35 more strongly couples the arm head 20 to the retainer 30 via a tensile force having elasticity.

The retainer 30 includes a body 32 formed of synthetic resins and a reinforcement member 50. The body 32 is a member having a rod shape. The body 32 may be formed of, for example, a material such as polypropylene (PP) resin or the like. The reinforcement member 50 is coupled to an end of the retainer 30.

The reinforcement member 50 is formed of a metal material. For example, the reinforcement member 50 may be formed of carbon steel, stainless steel, or the like. The reinforcement member 50 is a member having a plate shape, and the exterior of the reinforcement member 50 follows the shape of an end of the retainer 30. The reinforcement member 50 may be easily manufactured by trimming a metal having a plate shape to have the same shape via molding.

The reinforcement member 50 may be coupled to the body 32 by an insert molding method. Since the reinforcement member 50 is manufactured with a metal, namely, a material having strength higher than that of the body 32, the reinforcement member 50 is not easily worn away due to friction on the arm head 20. The reinforcement member 50 includes a pair. In this case, the pair of reinforcement members are symmetrically disposed each other. The pair of reinforcement members 50 are disposed to be spaced apart from each other. The reinforcement member 50 is coupled to a portion of the retainer 30, which is adjacent to the arm head 20.

The reinforcement member 50 includes a first lock back portion 52 and a second lock back portion 54. The first lock back portion 52 and the second lock back portion 54 are grooves formed concavely to accommodate a stopper 22 disposed in the arm head 20. The first lock back portion 52 and the second lock back portion 54 are hanged to the stopper 22 disposed in the arm head 20, thereby restraining the retainer 30 from rotating respect to the arm head 20. Since the first lock back portion 52 and the second lock back portion 54 frequently contacts the stopper 22, the first lock back portion 52 and the second lock back portion 54 need durability. In the current embodiment of the present invention, by forming the first lock back portion 52 and the second lock back portion 54 in the reinforcement member 50, there is an effect in which a lock back function is not damaged although the first lock back portion 52 and the second lock back portion 54 frequently contacts the stopper 22.

Below, an effect in which the reinforcement member 50 has sufficient durability in spite of a repeated toggling operation of the retainer 30 is described in detail.

Referring to FIG. 2, it is possible to comprehend a structure in which the reinforcement member 50 is inserted into the body 32. The strength of the reinforcement member 50 is higher than that of the body 32. In addition, referring to FIG. 3, the reinforcement member 50 includes the first lock back portion 52 and the second lock back portion 54, as described above. The first lock back portion 52 and the second lock back portion 54 are concave portions and frequently contacts the stopper 22 disposed in the arm head 20. A state in which the stopper 22 is accommodated in the first lock back portion 52 is a first lock back state, and a state in which the stopper 22 is accommodated in the second lock back portion 54 is a second lock back state. When an external force of the extent of getting out of the second lock back state is applied to the retainer 30, the retainer 30 is damaged. Actually, the reinforcement member 50 has valid durability when the first lock back state in which the stopper 22 is accommodated in the first lock back portion 52 and the second lock back state in which the stopper 22 is accommodated in the second lock back portion 54 are repeated. In this case, since the reinforcement member 50 has a sufficient strength, the reinforcement member 50 is not worn away to the extent that the lock back function is lost, although a repeated contact with the stopper 22 occurs.

In this manner, in a wiper device according to the present invention, by coupling a reinforcement member formed of a metal material to an end of a retainer formed of a plastic, the durability of the retainer is improved, and thus a lock back function is not damaged in spite of a repeated lock back operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wiper device having improved durability, the wiper device comprising:
   an arm head having one end fixed to a pivot shaft installed on a vehicle; and
   an elongated retainer having one contoured end coupled to the arm head to rotate relative to the arm head and an opposite end coupled to a blade for wiping a glass of the vehicle,
   wherein the retainer comprises:
   an elongated body formed of synthetic resins, one end of which partially forms the contoured end; and
   a reinforcement member that is coupled to within a portion of the elongated body, which is adjacent to the arm head, and is formed of a metal material,
   wherein the reinforcement member is a member having a plate shape, and an exterior edge contour of the reinforcement member follows the contour of the one end of the retainer, the reinforcement member being manufactured by trimming a metal having the plate shape to have the same shape as the shape of the end of the retainer via molding, and
   wherein the exterior edge of the reinforcement member includes a first lock back portion and a second lock back portion, and the first lock back portion and the second lock back portion are grooves formed concavely to accommodate a stopper disposed in the arm head.

2. The wiper device of claim 1, wherein the reinforcement member is coupled to the body by an insert molding method.

3. The wiper device of claim 1, wherein the reinforcement member comprises a pair of reinforcement members disposed symmetrically to each other, and the pair of reinforcement members are disposed to be spaced apart from each other.

* * * * *